(12) United States Patent
Matlack et al.

(10) Patent No.: US 10,243,295 B2
(45) Date of Patent: Mar. 26, 2019

(54) 3D-PRINTED SEALS AND CONNECTORS FOR ELECTRIC SUBMERSIBLE PUMPS

(71) Applicant: Schlumberger Technology Corporation, Sugar Land, TX (US)

(72) Inventors: Bradley Matlack, Shawnee, KS (US); Gregory Howard Manke, Overland Park, KS (US); Jason Holzmueller, Lawrence, KS (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/566,997

(22) PCT Filed: Apr. 16, 2015

(86) PCT No.: PCT/US2015/026143
§ 371 (c)(1),
(2) Date: Oct. 16, 2017

(87) PCT Pub. No.: WO2016/167770
PCT Pub. Date: Oct. 20, 2016

(65) Prior Publication Data
US 2018/0131124 A1     May 10, 2018

(51) Int. Cl.
*H01R 13/52*     (2006.01)
*F04D 13/10*     (2006.01)
*F04D 29/08*     (2006.01)
*F04D 13/06*     (2006.01)
*E21B 17/02*     (2006.01)
*B33Y 80/00*     (2015.01)

(52) U.S. Cl.
CPC ....... *H01R 13/5205* (2013.01); *E21B 17/023* (2013.01); *F04D 13/0693* (2013.01); *F04D 13/10* (2013.01); *F04D 29/086* (2013.01); *B33Y 80/00* (2014.12)

(58) Field of Classification Search
CPC ...... H01R 13/5205; B33Y 80/00; B33Y 30/00
See application file for complete search history.

(56) References Cited

U.S. PATENT DOCUMENTS 6,361,342 B1    3/2002    Cox
6,868,580 B1    3/2005    Diggs
(Continued)

*Primary Examiner* — Xuong Chung Trans

(57) ABSTRACT

An electrical connector assembly for electric submersible pumps (ESPs) has a fluid impenetrable seal 3D-printed between the power cable and an internal housing component of the electrical connector assembly. Electrical insulation or dielectric for a conductor of the power cable may also be 3D-printed integrally with the fluid seal. The housing component, such as an internal electrical housing, may also be 3D-printed integrally with the printed seal. Likewise, in an implementation, the 3D-printed seal, the internal housing component, and an outer pothead case may all be 3D-printed as a unit onto the power cable. The 3D-printed seal and associated pothead components may be composed of a variety of chemical-resistant materials, such as printed polyarylether-ketones, printed fluorinated polymers, and metal alloys. The 3D-printed seal may also include barrier materials or reinforcement fillers to enhance strength and chemical resistance to well fluids and gases.

15 Claims, 6 Drawing Sheets

(56) References Cited

U.S. PATENT DOCUMENTS

| | | | |
|---|---|---|---|
| 7,325,596 B2 | 2/2008 | Ebner | |
| 8,398,420 B2 * | 3/2013 | Watson | E21B 17/025 |
| | | | 439/275 |
| 8,512,074 B2 * | 8/2013 | Frey | H01R 13/523 |
| | | | 439/279 |
| 2010/0167582 A1 | 7/2010 | Watson | |
| 2013/0298403 A1 | 11/2013 | Thomson et al. | |
| 2014/0231266 A1 * | 8/2014 | Sherrer | B29C 67/0051 |
| | | | 205/136 |
| 2014/0291022 A1 * | 10/2014 | Yang | F42B 1/032 |
| | | | 175/2 |
| 2015/0035186 A1 * | 2/2015 | Teken | B41J 2/14145 |
| | | | 264/40.4 |
| 2015/0060042 A1 | 3/2015 | Shilpiekandula et al. | |

\* cited by examiner

3D-PRINTED SEALS AND CONNECTORS FOR ELECTRIC SUBMERSIBLE PUMPS

BACKGROUND

A motor lead extension (MLE) for connecting power to the motor of an electric submersible pump (ESP) includes single-phase or three-phase conductors in a power cable. The MLE is fastened to the ESP by hardware called a pothead connector. The pothead connector may have an exterior flange and several mechanisms or components (front block, rear block, seal block, solder joint, springs, shrouds, etc.) designed to prevent fluid and gas from traveling through the connector and into the motor during operation.

The fluid and gas seal between the power cable and a housing component (electrical housing, internal block, or outer case) of the pothead connector is difficult to make. The fluid seal is conventionally created by soldering the power cable (its metallic barrier) to a housing component of the pothead, or by mechanically fastening a component of the power cable (insulation, barrier, or armor) to the pothead, or by installing an elastomeric seal. But solder joints are weak and vulnerable to human error during the soldering operation and require significant time and training to make a reliable connection. Solder joints also require sufficient space for a torch to be used and solder applied. Mechanical fasteners require skill and are ineffective with soft lead barriers. The elastomeric seals require an operator to correctly install them.

SUMMARY 3D-printed seals and connectors for electric submersible pumps (ESPs) are provided. An example apparatus includes an electrical connector assembly for providing electric power to an electric submersible pump (ESP), a power cable of the electrical connector assembly including at least one electrical conductor, a pothead connector of the electrical connector assembly including at least a housing component, and at least a 3D-printed seal, printed between the power cable and the housing component. A 3D-printed seal for an electrical connector assembly of an electric submersible pump comprises a 3D-printed seal block printed in a shape suitable for sealing between an exterior of at least one conductor and a housing component of the electrical connector assembly, a front block 3D-printed on a first side of the 3D-printed seal block, and a rear block 3D-printed on a second side of the 3D-printed seal block. An example method includes securing a power cable with respect to a 3D printer, the power cable including at least one electrical conductor for powering an electric submersible pump (ESP), and 3D-printing a fluid impenetrable seal between the power cable and a housing component of an electrical connector assembly for connecting the power cable to the ESP.

This summary is not intended to identify key or essential features of the claimed subject matter, nor is it intended to be used as an aid in limiting the scope of the claimed subject matter.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

DETAILED DESCRIPTION

Overview

Figure 1:
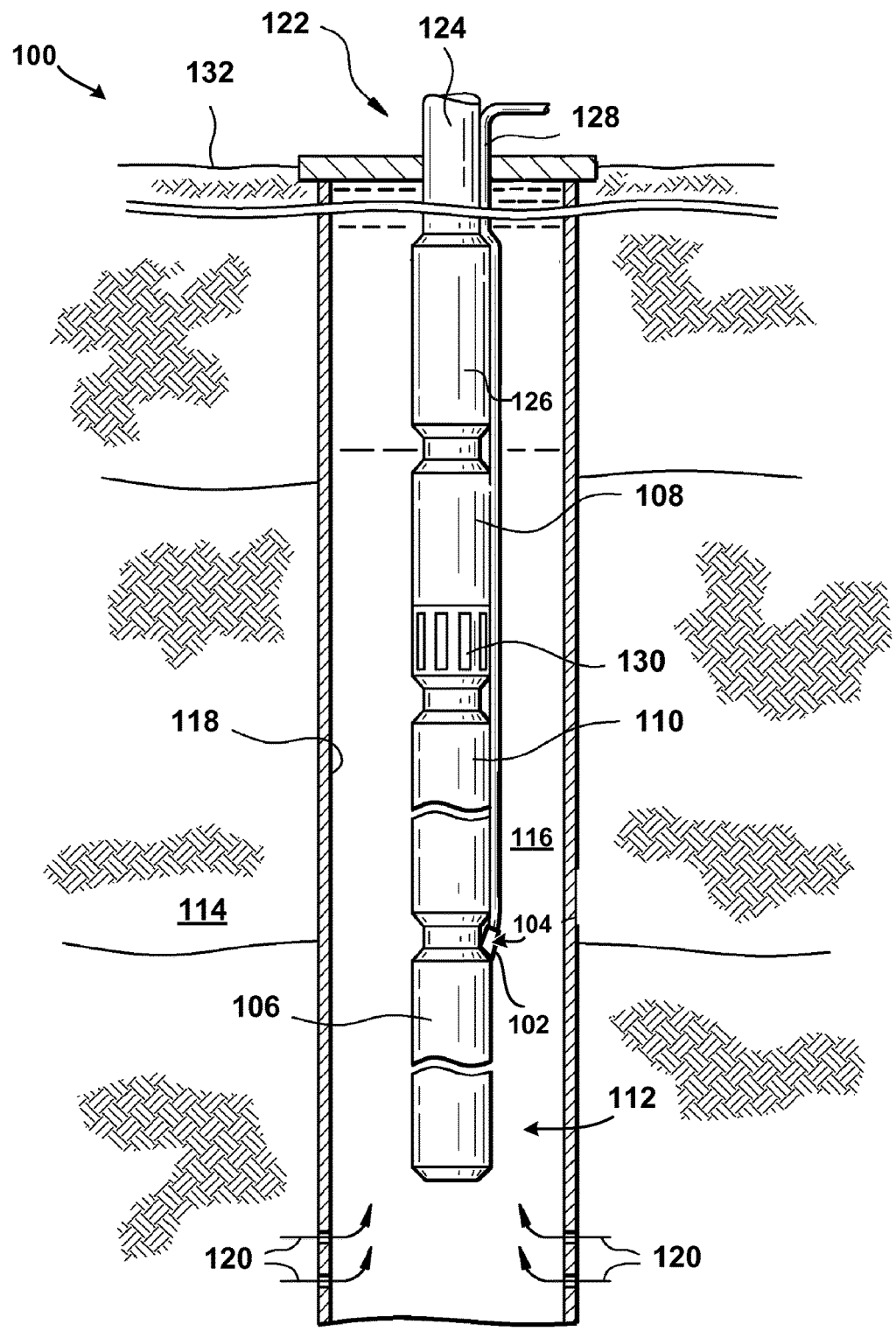
FIG. 1 is a diagram of an example electric submersible pump (ESP) that includes at least one electrical connector assembly containing a 3D-printed seal.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

This disclosure describes 3D-printed seals and connectors for electric submersible pumps (ESPs). An example manufacturing method applies 3D-printing or rapid prototyping to the creation of fluid impenetrable seals for the interior of pothead connectors. A pothead connector fastens motor lead extensions (MLEs), which deliver power from the surface, to a downhole motor of an ESP. The pothead connection is difficult to make robust because the connection of the power cables to the motor is both electrical and mechanical while demanding an impenetrable seal around the power cables to prevent fluids, corrosives, and pressurized gases, often at high temperature, from forcing their way into the motor.

3D-printed fluid seals, printed between the power cable and an internal housing of a pothead connector, such as the electrical housing or an internal block, can save the manufacturing process from having to create a conventional metal-to-metal or implement a mechanical fastener. Such a metal-to-metal seal is conventionally preferred, and is conventionally created by soldering a metallic barrier of the power cable to a component of the electrical connector or by providing a mechanical fastener which acts as a barrier to fluid and gas. A soldered joint, however, is very weak and vulnerable to human error during installation, as well as requiring a significant amount of time and training to make a reliable and robust connection. Elastomer seals, installed manually, may be permeable to fluid and gas (e.g., $H_2S$), especially in severe service applications.

Various 3D-printed seal components are described herein to improve conventional techniques for sealing the power cables of an ESP at the pothead connector. In an implementation, a seal is 3D-printed between power cables and an interior housing (e.g., an electrical housing or an internal block) of a pothead connector. Or, various separate components within a pothead connector are 3D-printed and installed as a single unit. In an implementation, the seal and surrounding components are 3D-printed as a single unit onto the power cable, or printed as a discrete single unit and installed later in one piece.

In an implementation, the 3D-printed seal also incorporates a wrap element of the power cables, such as an insulation, a jacket, or a filler between or around conductors. In an implementation, the fluid impenetrable seal, the interior housing, and a case or flange of the pothead connector are all printed as a single integral unit onto the power cable(s). Or, a conventional case or flange may be added over 3D-printed interior parts. In an implementation, the 3D-printed seal and associated integral components may incorporate a printed barrier layer for extra protection. In an implementation, the 3D-printed seal and associated integral components may incorporate a blocking agent to reduce the permeability of the 3D-printed seal to corrosives and high temperature well fluids and gases.

Example Systems

FIG. 1 shows an example electric submersible pumping system ("ESP") 100 that includes at least one electrical connector assembly 102 containing a 3D-printed seal 104. The electrical connector assembly 102 may include a pothead connector to fasten motor lead extensions (MLEs) both mechanically and electrically to a motor section 106 of the ESP 100. The MLEs attach the motor section 106 to power from the surface 132. The 3D-printed seal 104 provides a fluid impenetrable barrier to prevent a fluid or a gas from passing between the motor 106 of the ESP 100 and an exterior of the electrical connector assembly 102.

The example ESP 100 may include a variety of sections and components depending on the particular application or environment in which the system is used. Examples of components utilized in ESP 100 include at least one motor section 106, one or more submersible pumps 108, and one or more motor protectors 110 coupled together to form stages, sections, or segments of the ESP 100, also referred to as an ESP string when there are multiple sections.

The example ESP 100 is designed for deployment in a well 112 within a geological formation 114 containing desirable production fluids, such as petroleum. A wellbore 116 is drilled into the formation 114, and in some applications is lined with a wellbore casing 118. Perforations 120 are formed through wellbore casing 118 to enable flow of fluids between the surrounding formation 114 and the wellbore 116.

The example submersible pumping system 100 is deployed in wellbore 116 by a deployment system 122 that may have a variety of configurations. For example, deployment system 122 includes tubing 124, such as coiled tubing or production tubing 124 connected to a submersible pump 108 by a connector section 126. Power is provided to at least one submersible motor section 106 via a power cable 128, which may include or be attached to the aforementioned MLEs. The submersible motor 106, in turn, mechanically drives a submersible pump 108, which draws in well fluid through a pump intake 130.

The example ESP 100 is only one example of many types of electric submersible pumps or pumping systems that may utilize an example electrical connector assembly 102 with a 3D-printed seal 104.

Figure 2:
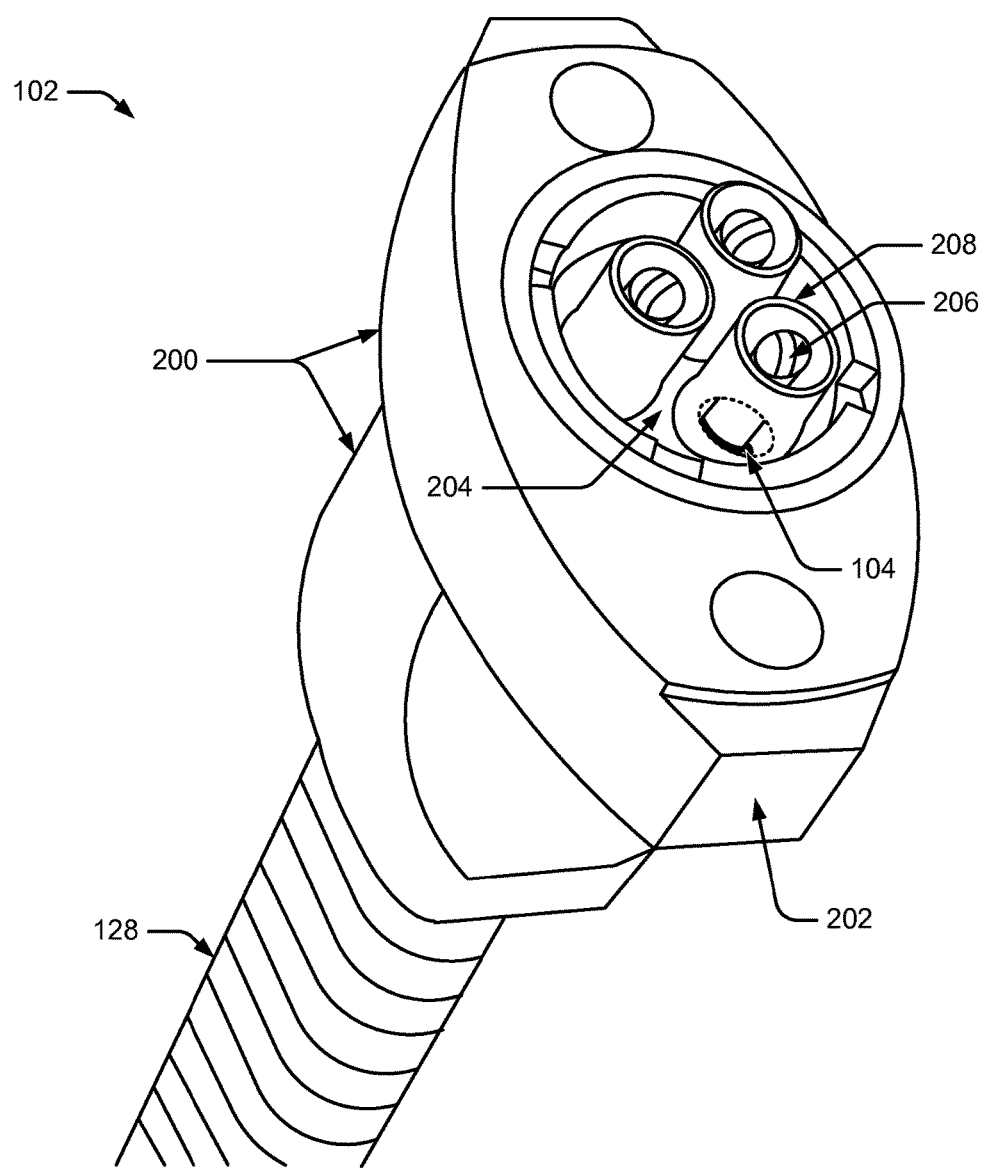
FIG. 2 is a diagram of an example electrical connector assembly including a 3D-printed seal.

FIG. 2 shows an example electrical connector assembly 102 for connecting a power cable 128 mechanically and electrically to a motor section 106 of an ESP 100. The example electrical connector assembly 102 may have a pothead connector 200 with various internal and exterior housing components, such as an exterior case 202 and one or more interior blocks 204 or housings. The power cable 128 terminates in one or more exposed electrical conductors 206.

The 3D-printed fluid seal 104 can be implemented in numerous types of pothead connectors 200 and electrical connector assemblies 102. Example pothead connectors are described, for example, in U.S. Patent Application No. 2010/0167582 to Watson, and U.S. Pat. No. 7,325,596 to Ebner, both incorporated herein by reference in their entireties.

The example electrical connector assembly 102 has one or more 3D-printed components, such as a 3D-printed seal 104 between the conductors 206 of the power cable 128 and a housing component 208 (e.g., a tube or block electrical housing) of the example electrical connector assembly 102. Other parts of the example electrical connector assembly 102 may also be 3D-printed with the 3D-printed seal 104, as a single unit. For example, an interior block 204, a housing component 208, part of the case 202, electrical insulation, space filler, and so forth, may be printed as a single, integral, continuously printed component together with the 3D-printed seal 104. In an implementation, the integral component may be 3D-printed as a discrete unit and the discrete unit installed during assembly of the example electrical connector assembly 102. In some circumstances the integral component may be 3D-printed in place, as part of the manufacture, e.g., of a larger component of the example electrical connector assembly 102. Thus, in an implementation, a 3D-printed seal 104 and one or more other components of the example electrical connector assembly 102 are directly 3D-printed on the power cable 128 (or the MLEs), proceeding from the power cable 128 or MLEs radially outward. In a variation, the 3D-printed seal 104 and one or more other components of the example electrical connector assembly 102 are 3D-printed from a left side to a right side of the electrical connector assembly 102. For example, the bottom of the printing may be the left side of the pothead connector 200 and the top of the printing is the right side of the pothead connector 200, with the power cable 128 and electrical conductors 206 occurring crosswise, midway through the printing job.

Figure 3:
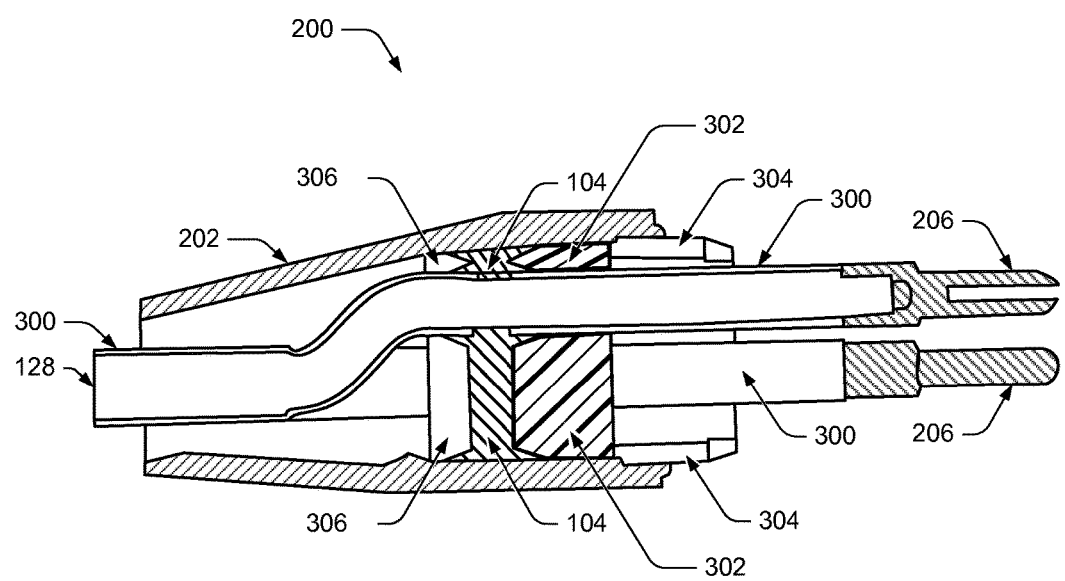
FIG. 3 is a diagram of another example electrical connector assembly including a 3D-printed seal block.

FIG. 3 shows another example of a pothead connector 200 including an example 3D-printed seal 104 printed into the pothead connector 200 as a seal block. The power cable 128 or MLE may be a flat cable containing, for example, three electrical conductors 206. Each conductor 206 is surrounded by one or more layers of electrical insulation 300 to protect and insulate the conductors 206 from one another and from electrical conduction with the exterior case 202.

A front block 302 provides packing, support, and insulation for the conductors 206, and may extend to a packing gland 304. Likewise, a rear block 306 provides packing, support, and insulation for the conductors 206. In an implementation, the 3D-printed seal 104 may be 3D-printed into the pothead connector 200. In an implementation, the front block 302, the 3D-printed seal 104, and the rear block 306 are all contiguously 3D-printed into the pothead connector 200.

In an implementation, the single, integral, 3D-printed unit that includes the front block 302, the 3D-printed seal 104, and the rear block 306 may be 3D-printed directly on the conductors 206 and/or insulation 300 of the power cable 128, and then the exterior casing 202 (flange, housing, cap, etc.) may be added around the outside of the 3D-printed single integral unit. For example, the exterior casing 202 may be pulled or slid over the 3D-printed components.

In an implementation, the front block 302, the 3D-printed seal 104, and the rear block 306 are 3D-printed as a discrete single unit, outside the pothead connector 200. The discrete single unit is then installed into the pothead connector 200 during assembly. The integral 3D-printing of the front block 302, the 3D-printed seal 104, and the rear block 306 ensures a reliable bond between the front block 302, the 3D-printed seal 104, and the rear block 306.

In an implementation, the front block 302, the 3D-printed seal 104, and the rear block 306 are 3D-printed as an integral single unit on the conductors 206 and/or insulation 300 of the power cable 128, and the exterior casing 202 (flange, housing, cap, etc.) is also 3D-printed around the exterior of the 3D-printed single integral unit. In an implementation, the 3D-printing initiates on a given axial position of the power cable 128, and proceeds radially outward, including 3D-printing an exterior case 202. The process moves axially along the power cable 128 until a complete pothead connector 200 is rendered, providing a finished electrical connector assembly 102.

When the front block 302, the seal block including the 3D-printed seal 104, and the rear block 306 are printed as a single discrete unit for later assembly into the pothead connector 200, the material for the seal 104 may be selected to seal, but not adhere to, insulation layers 300 surrounding the conductors 206 and not adhere to an exterior case 202. On the other hand, when the front block 302, the seal block including the 3D-printed seal 104, and the rear block 306 are printed directly onto the power cable 128 to make an integrally printed single unit, the material for the 3D-printed seal 104 may be selected to adhere to, bond, and/or meld with the insulation layers 300 surrounding the conductors 206 and adhere or bond to the exterior case 202, thereby making the fluid impenetrable seal.

Figure 4:
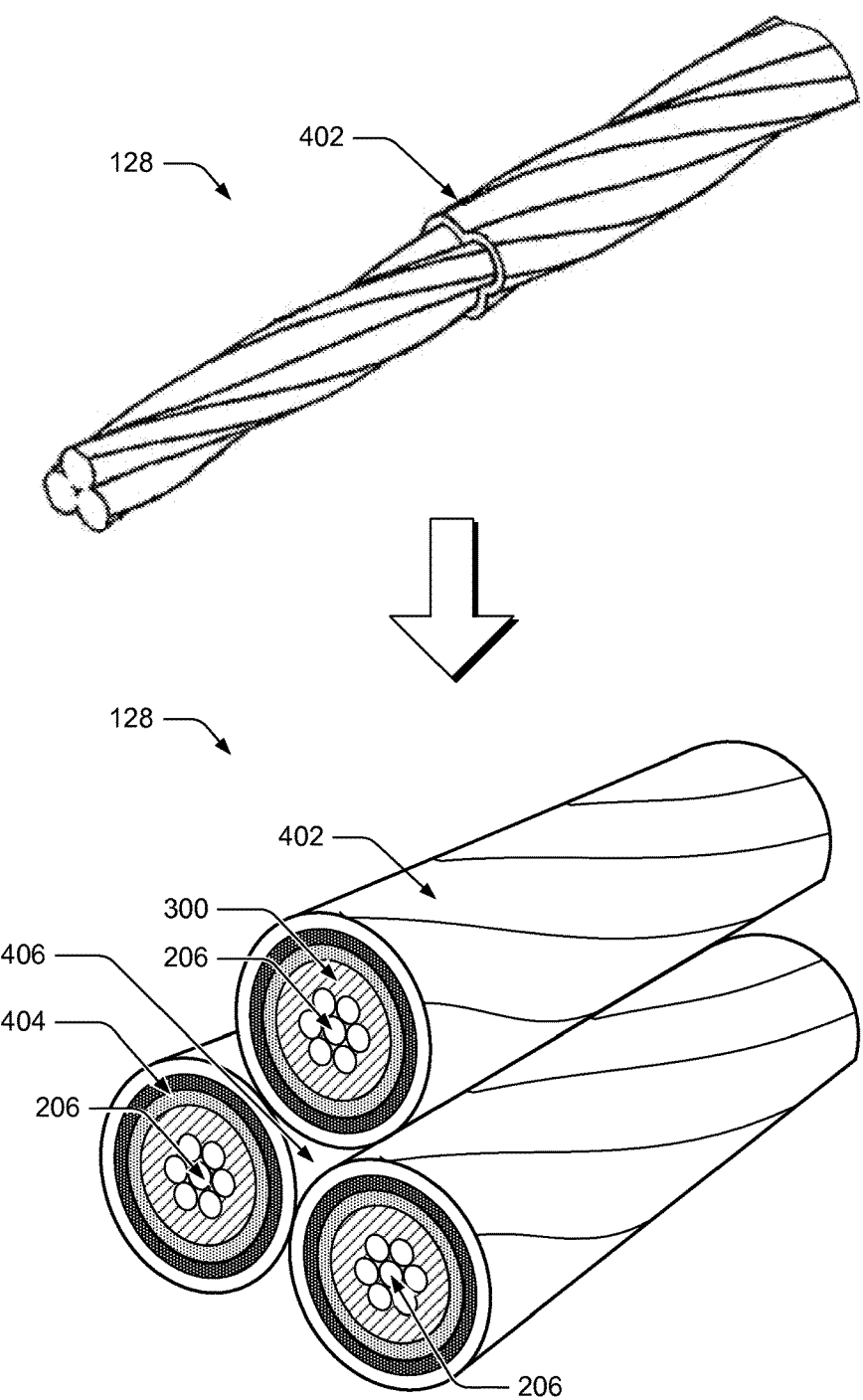
FIG. 4 is a diagram of an example power cable for an ESP, including wrap layers at least in part deposited or bonded by a 3D printer during 3D-printing of a fluid impenetrable seal.

FIG. 4 shows an example round power cable 128 with three insulated conductors 206, corresponding to service from a three-phase AC power supply. In 3D-printing an example fluid impenetrable seal 104 for the example electrical conductor assembly 102, a 3D-printer may adhere or bond the sealing material to the insulation 300 or armor layers 402 surrounding a conductor 206 or power cable 128 of the ESP 100. The material for the 3D-printed seal 104 may also act as filler 406 between individual wires of the power cable 128.

The 3D-printing process for making a 3D-printed seal 104 may also print primary insulation 300, additional insulation 300, an armor 402, or a filler 406 for a single conductor 206 of the power cable 128 or for the entire power cable 128. This allows the 3D printer to make (print) the 3D-printed fluid seal 104 seamlessly or continuously ("integrally") with the insulation 300 or the armor 402 of the wire conductors 206 of the power cable 128. Thus, in an implementation, a 3D printer prints an entire electrical connector assembly 102 or the internal components of the electrical connector assembly 102 onto bare wire conductors 206. Or, in an implementation, an example process removes some or all of the insulation 300 from a conductor 206 in order to bond some or all of the axial length of the 3D-printed seal 104 onto the wire conductor 206.

In an implementation, a 3D printer prints at least some electrical insulation 300 while printing an example 3D-printed seal 104. A relatively hard polymer to be used as electrical insulation 300 for an individual conductor member 206 may be made of crystallized polyether ether ketone (PEEK), insulation-grade ethylene-propylene diene monomer (EPDM), polypropylene, a perfluoroalkoxy (PFA) fluoropolymer, a fluorinated ethylene propylene (FEP) polymer, or another suitable polymer based on physical, electrical and bonding characteristics.

As an outer jacket 404 over the insulation 300 for copper conductors 206, a soft polymer such as ethylene-propylene diene monomer (EPDM), amorphous PEEK, FEP, PFA, TEFZEL modified ethylene-tetrafluoroethylene (ETFE) fluoroplastic, polyvinylidene fluoride (PVDF), or other suitable soft polymer may be applied by the 3D printer to allow the soft jacket 404 to deform and to fill space between a wire of the power cable 128 (or MLE) and the 3D-printed seal 104 (TEFZEL, DuPont Corporation, Wilmington, Del.). Such a relatively soft polymer may be extruded over the bundled conductors 206 to fill the interstices between the conductors 206. The soft polymer may be bondable to the hard polymer of the insulation 300. The soft polymer can have a very high resistance to harsh chemicals, such as hydrogen sulfide and carbon dioxide to protect the insulation 300 in case there is a breach in a metallic cladding of the example electrical connector assembly 102.

Figure 5:
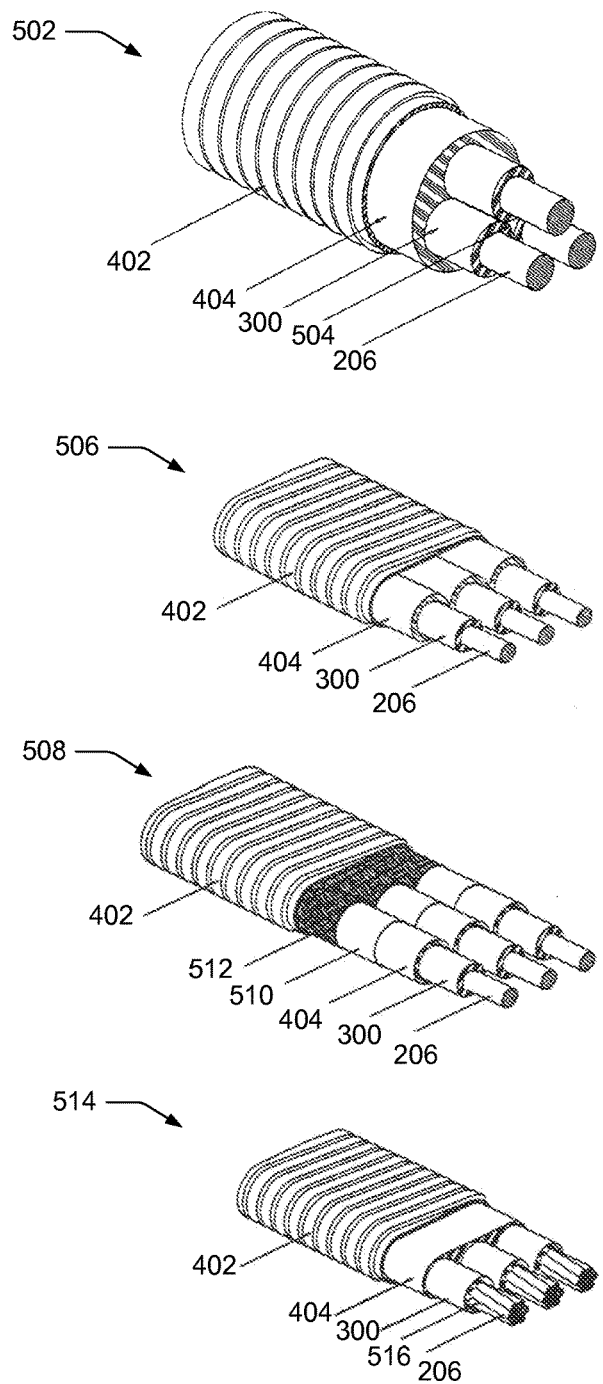
FIG. 5 is a diagram of example power cable styles to which a 3D-printed fluid seal can be bonded, including wrap layers of the power cables at least in part deposited or bonded during 3D-printing of the fluid seal.

FIG. 5 shows different styles of round and flat MLEs, i.e., motor lead extension cables extending the power cable 128, around which the example 3D-printed fluid seal 104 can be bonded during deposition by a 3D printer. An MLE can be a low-profile, flat cable. The MLE may be spliced to a lower end of a round or flat main power cable 128, banded to the side of the ESP 100, and may have a male plug termination for connecting into the motor 106. The MLE may have a thin layer of high-dielectric polyamide material wrapped or bonded directly to the copper conductors 206. This may enable a thinner geometry of electrical insulation 300.

A round style 502 of the power cable 128 or MLE may include conductors 206 for one-phase or three-phase service, a filler layer 504, an electrical insulation layer 300, a jacket layer 404, and an armor layer 402. A standard flat style 506 of the power cable 128 may include conductors 206 for one-phase or three-phase service, an electrical insulation layer 300, a jacket layer 404, and an armor layer 402. A tape and braid flat style 508 of the power cable 128 may include conductors 206 for one-phase or three-phase service, an electrical insulation layer 300, a jacket layer 404, a barrier layer 510, a braid or braid substitute layer 512, and an armor layer 402. An encapsulated flat style 514 of the power cable 128 may include conductors 206 for one-phase or three-phase service, a coating layer 516, such as a gas block coating, an electrical insulation layer 300, a jacket layer 404, and an armor layer 402. A common conventional ESP power cable 128 includes an electrical conductor 206, tape-wrapped insulation layer 300 and/or extruded insulation layer 300, tape wrapped or extruded lead barrier 510, and metallic strip-wrapped armor 402.

In an implementation, the example 3D-printed fluid seal 104 may include at least part of a layer for wrapping one or more of the conductors 206 of a given style of power cable 128 or MLE. Thus, the 3D printer may deposit a 3D-printed seal 104 that further includes at least part of a layer of a printed electrical insulation 300, a printed dielectric, a printed filler 504, a printed encapsulation, braid, braid substitute, or jacket 404, a printed armor 402, a printed coating 516, or a printed barrier 510 associated with an electrical conductor 206.

Example 3D-printing and Materials 3D-printing builds components from a digital model by printing layers of materials on top of each other, sometimes using a binding agent. Materials available for printing include both metals and polymers. A 3D-printed fluid seal 104 that is printed, for example, between a metallic barrier or other component of the power cable 128 and an internal housing or block of a pothead connector 200 removes the training, time, and variability that conventionally exists in the making such a seal 104. The 3D-printing process also allows such reliable seals 104 or joints to be created in tight spaces.

In an implementation, an example 3D-printing platform is slowly lowered through a matrix of liquid or powder polymer while a focused moveable laser or ultraviolet light source melts or cures the resin into the example fluid seal 104 and other associated components of the example electrical connector assembly 102. In another example 3D-printing process, a small extruder or nozzle that moves along axes in an x-y plane casts a thin filament onto a platform (that is mobile in the third-dimensional z-axis) using repeated passes to build up the example fluid seal 104 and other associated components of the example electrical connector assembly.

To create the example 3D-printed fluid seal 104 and associated components of the electrical connector assembly 102, numerous 3D-printing processes may be utilized. Selective laser melting (SLM), direct metal laser sintering (DMLS), selective laser sintering (SLS), fused deposition modeling (FDM), and fused filament fabrication (FFF) may be recruited depending on a particular design of the 3D-printed fluid seal 104 to be included in a particular electrical connector assembly 102. A liquid-curing technology may also be employed, such as stereolithography (SLA), for example. In some cases, laminated object manufacturing (LOM) may applied to thin layers of a polymer or metal, which are cut and joined together, e.g., to build an internal housing component.

A 3D printer that creates from metals may be used for particular applications. Electron beam freeform fabrication (EBF3) may be used, or an electron-beam melting (EBM) process. Selective laser melting (SLM) may be used in order to manufacture from some metals and alloys. Thermoplastic powder may be used with selective heat sintering (SHS), or Selective laser sintering (SLS) may be used with thermoplastics and metal powders.

In conjunction with the 3D-printing process selected, the example 3D-printed fluid seal 104, the front seal block 302, the rear seal block 306, the outer case 202, or another component of the assembly 102 can be composed of, and/or 3D-printed in numerous types of materials. The materials that can be used to form these components include, for example, various hard engineering grade plastics. In an implementation, the example 3D-printed fluid seal 104 and/or an associated component of the example electrical connector assembly 102 can be composed of a material with excellent fluid and heat resistance along with good dielectric and mechanical properties. There are numerous materials that are suitable and can be formed into shape by a 3D-printer, for example, a printed polyaryletherketone (PAEK), such as a poly ether ether ketone (PEEK), a poly ether ketone (PEK), a poly ether ketone ether ketone ketone (PEKEKK), a poly ether ketone ketone (PEKK), or a poly (aryl) ether ketone ketone PEEKK.

Likewise, the components may be composed of, and 3D-printed in, a fluorinated polymer, such as a fluorinated ethylene propylene (FEP), a polytetrafluoroethylene (PTFE), an expanded polytetrafluoroethylene (ePTFE), a perfluoroalkoxy polymer (PFA), an epitaxial co-crystallized alloy (ECA), or an ethylene tetrafluoroethylene (ETFE).

In an implementation, the example 3D-printed fluid seal 104, front seal block 302, rear seal block 306, outer case 202, or another component of the assembly 102 may be composed of, and 3D-printed from, a polyimide resin, a polyphenylsulfone (PPSU), a sulfone polymer, a liquid crystal polymer, a perfluoroinated thermoplastic, a bismaleimide resin, a cyanate ester, a self-reinforced polyphenylene (SRP), a metal for a metal-to-metal seal, or a thermoplastic or structural composite material capable of a phase transition useful for 3D-printing, such as a liquid to solid transition, or a solid powder to liquid to sintered solid powder transition.

These components may be composed of a printed composite material including a neat resin and a reinforcement filler, such as a glass fiber, a carbon fiber, a carbon nanotube (CNT), or graphene sheets, for example.

In an implementation, the 3D-printed material for the example 3D-printed fluid seal 104, the front seal block 302, the rear seal block 306, the outer case 202, or another component of the assembly 102 may be a perfluoroelastomer. The 3D printer may also attach an additional barrier surface to such a perfluoroelastomer or to another material.

In an implementation, a barrier surface for the 3D-printed fluid seal 104 may be a fluorinated polymeric coating, such as a fluorinated ethylene propylene (FEP), a polytetrafluoroethylene (PTFE), an expanded polytetrafluoroethylene (ePTFE), a perfluoroalkoxy polymer (PFA), an epitaxial co-crystallized alloy (ECA), or an ethylene tetrafluoroethylene (ETFE). Such fluorinated polymers are chemically inert, thermally stable, and can be successfully applied and bonded to a component of the power cable 128. An ePTFE barrier surface on the 3D-printed fluid seal 104 provides a strong, microporous layer that is chemically inert, resistant to high temperatures, has a low coefficient of friction, and prevents water, steam, and other fluids from passing or even adsorbing onto its outer surface. An example barrier surface may range in thickness from a thin limit at the lowest resolution of the 3D-printer, to a thick limit of approximately 2-3 mils thick (i.e., 2-3 thousandths of an inch, or 0.05-0.07 millimeters).

In another implementation, the example 3D-printed barrier surface for the 3D-printed fluid seal 104 may be a polymer from the polyaryletherketone family, such as a poly ether ether ketone (PEEK), a poly ether ketone (PEK), a poly ether ketone ether ketone ketone (PEKEKK), a poly ether ketone ketone (PEKK), or a poly (aryl) ether ether ketone ketone PEEKK. These polyaryletherketones are also chemically inert, thermally stable, and can be readily applied and bonded to an armor 402 or other component of the power cable 128 or MLE.

The example 3D-printed fluid seal 104 or another component of the assembly 102 may also include an additional blocking agent in its 3D-printed composition. The blocking agent can further reduce permeability of the example 3D-printed fluid seal 104. In an implementation, the blocking agent can be a fiber, particle, or flake. The blocking agent may be of nanoscale size (1-100 nanometers), such as nanofibers, nanoparticles, or nanoflakes. The example blocking agent may consist of a clay, talc, mica, nanoclay, silica, graphene, carbon black, graphite nanoplatelets, metal particles or nanoparticles, or other organic or inorganic material that can be compounded with the example 3D-printed fluid seal 104 or a barrier surface of the example 3D-printed fluid seal 104, to make these more impervious to well fluid.

The example 3D-printed fluid seal 104, the front seal block 302, the rear seal block 306, the outer case 202, or another component of the assembly 102 may also be 3D-printed from a metal or alloy, for example: a stainless steel, a 316 stainless steel, a 420 stainless steel, an austenitic stainless steel, a duplex steel, a tool steel, a maraging steel, a mild steel, a nickel-steel alloy, a non-ferrous alloy, a nickel alloy, an 18Ni300 alloy, an INCONEL 625 alloy, or an INCONEL 718 alloy (Special Metals Corporation, New Hartford, N.Y.). The 3D-printed fluid seal 104, front seal block 302, rear seal block 306, outer case 202, or another component of the assembly 102 may also be 3D-printed from other metals, alloys, or ceramic, for example: a HASTELLOY C nickel-chromium-molybdenum-tungsten alloy (Haynes International Inc., Kokomo, Ind.), a brass alloy, a bronze alloy, a copper alloy, a copper-manganese-nickel alloy, a Cu10Sn alloy, a Cu10Mn3Ni alloy, a cobalt alloy, a chromium-cobalt alloy, a cobalt F75 alloy, a cobalt F90 alloy, an aluminum alloy, a titanium alloy, or an $Al_2O_3$—$TiO_2$ ceramic.

Example Method

Figure 6:
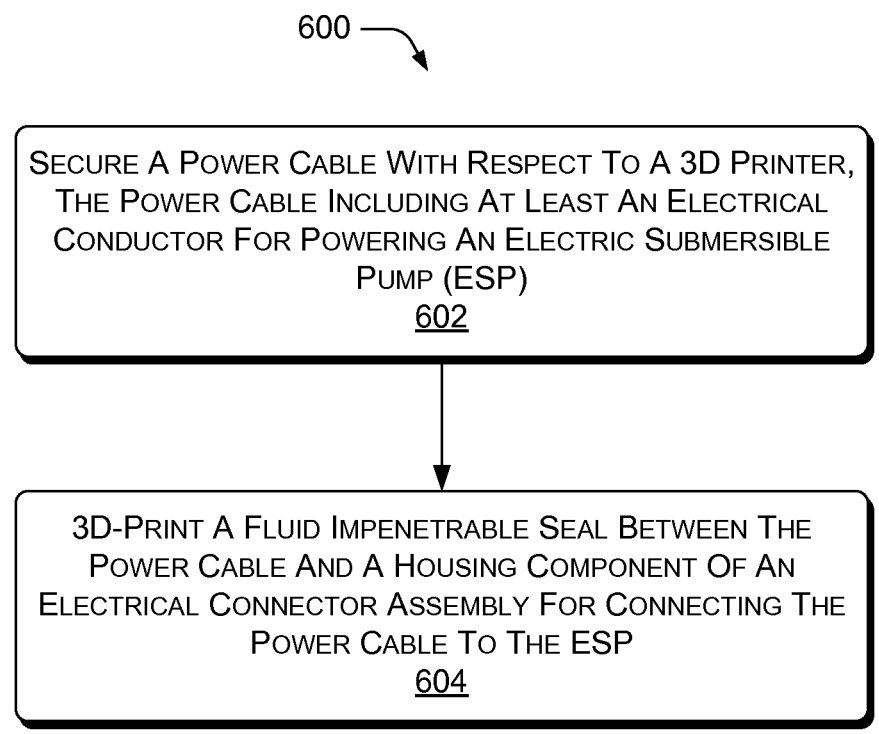
FIG. 6 is a flow diagram of an example method of making a 3D-printed fluid seal for an electrical connector assembly of an ESP.

FIG. 6 shows an example method 600 of making a 3D-printed fluid seal for an electrical connector assembly of an ESP. In the flow diagram, operations are shown in individual blocks.

At block 602, a power cable is secured with respect to a 3D printer. The power cable includes at least one electrical conductor for powering an electric submersible pump (ESP).

At block 604, a fluid impenetrable seal is 3D-printed between the power cable and a housing component of an electrical connector assembly for connecting the power cable to the ESP.

The example method 600 may further comprise 3D-printing an internal block of the electrical connector assembly as an integral single unit composed of a front block, a seal block, and a rear block, wherein the seal block is 3D-printed between the front block and the rear block in the integral single unit, and wherein the seal block includes the fluid impenetrable seal.

The example method 600 may further comprise integrally 3D-printing the fluid impenetrable seal, an internal block, and an outer case of the electrical connector assembly onto the power cable as a single unit.

The example method 600 may further comprise 3D-printing a printed electrical insulation or a printed dielectric for the at least one electrical conductor during 3D-printing the fluid impenetrable seal.

The example method 600 may further comprise printing the fluid impenetrable seal from a material selected from the group consisting of a polyaryletherketone, a polyamide, a polyamide-imide, a polyketone, a polyester, a polyphenylsulfone (PPSU), a sulfone polymer, a high-barrier polymer, a cross-linkable polymer, a fluorinated polymer, a perfluoroelastomer, a polyimide resin, a liquid crystal polymer, a self-reinforced polyphenylene (SRP), a perfluoroinated thermoplastic, a bismaleimide resin, a cyanate ester, a metal, and a structural composite material capable of a phase transition for 3D-printing.

CONCLUSION

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

The invention claimed is:

1. An apparatus, comprising:
   an electrical connector assembly for providing electric power to an electric submersible pump (ESP);
   a power cable of the electrical connector assembly including at least one electrical conductor;
   a pothead connector of the electrical connector assembly including at least a housing component; and
   at least a 3D-printed seal and 3D-printed electrical insulation printed between the power cable and the housing component.

2. The apparatus of claim 1, wherein the housing component is selected from the group consisting of an electrical housing inside the pothead connector, an internal block of the pothead connector, and an outer case of the pothead connector.

3. The apparatus of claim 1, wherein the 3D-printed seal is printed integrally with the housing component, as a single unit.

4. The apparatus of claim 1, wherein the 3D-printed seal further comprises a printed wrap for surrounding the at least one electrical conductor, the printed wrap selected from the group consisting of the printed electrical insulation, a printed dielectric, a printed filler, a printed jacket, a printed encapsulation, a printed armor, a printed braid, a printed gas lock, and a printed barrier.

5. The apparatus of claim 1, wherein the 3D-printed seal comprises a printed seal block; and
   wherein the printed seal block, a printed front block, and a printed rear block are 3D-printed to comprise a single internal block of the electrical connector assembly.

6. The apparatus of claim 1, wherein the 3D-printed seal and the housing component are 3D-printed to comprise an integral single unit printed onto the power cable; and
   further comprising one of an outer case, a metal flange, or an armor pothead connector added over the integral single unit.

7. The apparatus of claim 1, wherein the 3D-printed seal, a printed electrical housing of the at least one electrical conductor, and a printed outer case of the pothead connector comprise a single unit integrally printed onto the power cable.

8. The apparatus of claim 1, wherein at least the 3D-printed seal comprises a polymer selected from the group consisting of a polyaryletherketone (PAEK), a poly ether ether ketone (PEEK), a poly ether ketone (PEK), a poly ether ketone ether ketone ketone (PEKEKK), a poly ether ketone ketone (PEKK), a poly (aryl) ether ether ketone ketone PEEKK, a fluorinated ethylene propylene (FEP), a polytetrafluoroethylene (PTFE), an expanded polytetrafluoroethylene (ePTFE), a perfluoroalkoxy polymer (PFA), an epitaxial co-crystallized alloy (ECA), and an ethylene tetrafluoroethylene (ETFE).

9. The apparatus of claim 1, wherein at least the 3D-printed seal comprises a printed perfluoroelastomer with a barrier surface comprising:
   a printed polyaryletherketone (PAEK) selected from the group consisting of a poly ether ether ketone (PEEK), a poly ether ketone (PEK), a poly ether ketone ether ketone ketone (PEKEKK), a poly ether ketone ketone (PEKK), and a poly (aryl) ether ether ketone ketone PEEKK, or
   a printed fluorinated polymer selected from the group consisting of a fluorinated ethylene propylene (FEP), a polytetrafluoroethylene (PTFE), an expanded polytetrafluoroethylene (ePTFE), a perfluoroalkoxy polymer (PFA), an epitaxial co-crystallized alloy (ECA), and an ethylene tetrafluoroethylene (ETFE).

10. The apparatus of claim 1, wherein at least the 3D-printed seal comprises a printable seal material selected from the group consisting of a polyimide resin, a polyphenylsulfone (PPSU), a sulfone polymer, a liquid crystal polymer, a perfluoroinated thermoplastic, a bismaleimide resin, a cyanate ester, a self-reinforced polyphenylene (SRP), a metal for a metal-to-metal seal, and a thermoplastic or structural composite material capable of a phase transition for 3D-printing.

11. The apparatus of claim 1, wherein at least the 3D-printed seal comprises a printed composite material including a neat resin and a reinforcement filler selected from the group consisting of a glass fiber, a carbon fiber, a carbon nanotube (CNT), and graphene sheets.

12. The apparatus of claim 1, further comprising an outer case of the pothead connector, a front block adjacent to the 3D printed seal, and a rear block adjacent to the 3D printed seal; and
wherein one of the 3D-printed seal, the outer case, the front block, or the rear block is 3D-printed from a metal, alloy, or ceramic selected from the group consisting of a stainless steel, a 316 stainless steel, a 420 stainless steel, an austenitic stainless steel, a duplex steel, a tool steel, a maraging steel, a mild steel, a nickel-steel alloy, a non-ferrous alloy, a nickel alloy, an 18Ni300 alloy, an INCONEL 625 alloy, an INCONEL 718 alloy, a HASTELLOY C alloy, a brass alloy, a bronze alloy, a copper alloy, a copper-manganese-nickel alloy, a Cu10Sn alloy, a Cu10Mn3Ni alloy, a cobalt alloy, a chromium-cobalt alloy, a cobalt F75 alloy, a cobalt F90 alloy, an aluminum alloy, a titanium alloy, and an Al2O3-TiO2 ceramic.

13. The apparatus of claim 1, wherein at least the 3D-printed seal comprises a nanoscale blocking agent to reduce a permeability of the 3D-printed seal, the nanoscale blocking agent selected from the group consisting of a clay, a carbon black, a talc, a mica, a nanoclay, a silica, a graphene, graphite nanoplatelets, metal particles, and metal nanoparticles.

14. A method, comprising:
securing a power cable with respect to a 3D printer, the power cable including at least one electrical conductor for powering an electric submersible pump (ESP);
3D-printing a fluid impenetrable seal between the power cable and a housing component of an electrical connector assembly for connecting the power cable to the ESP; and
3D-printing a printed electrical insulation or a printed dielectric for the at least one electrical conductor during 3D-printing the fluid impenetrable seal.

15. An apparatus, comprising:
an electrical connector assembly for providing electric power to an electric submersible pump (ESP);
a power cable of the electrical connector assembly including at least one electrical conductor;
a pothead connector of the electrical connector assembly including at least a housing component; and
at least a 3D-printed seal printed between the power cable and the housing component, wherein at least the 3D-printed seal comprises a printed perfluoroelastomer with a barrier surface comprising:
a printed polyaryletherketone (PAEK) selected from the group consisting of a poly ether ether ketone (PEEK), a poly ether ketone (PEK), a poly ether ketone ether ketone ketone (PEKEKK), a poly ether ketone ketone (PEKK), and a poly (aryl) ether ether ketone ketone PEEKK, or
a printed fluorinated polymer selected from the group consisting of a fluorinated ethylene propylene (FEP), a polytetrafluoroethylene (PTFE), an expanded polytetrafluoroethylene (ePTFE), a perfluoroalkoxy polymer (PFA), an epitaxial co-crystallized alloy (ECA), and an ethylene tetrafluoroethylene (ETFE).

\* \* \* \* \*